United States Patent
Beadle et al.

(10) Patent No.: US 7,562,045 B2
(45) Date of Patent: Jul. 14, 2009

(54) SYSTEM AND METHOD FOR MANAGING RELATIONSHIPS BETWEEN BROKERS AND TRADERS

(75) Inventors: Alastair J. D. Beadle, Hertfordshire (GB); Michael Sweeting, England (GB)

(73) Assignee: BGC Partners, Inc., New York, NY (US)

( * ) Notice: Subject to any disclaimer, the term of this patent is extended or adjusted under 35 U.S.C. 154(b) by 1047 days.

(21) Appl. No.: 10/716,304

(22) Filed: Nov. 18, 2003

(65) Prior Publication Data

US 2005/0108142 A1 May 19, 2005

(51) Int. Cl.
G06Q 40/00 (2006.01)
(52) U.S. Cl. .......................... 705/37; 705/26; 235/379; 235/380
(58) Field of Classification Search .................. 705/26, 705/37
See application file for complete search history.

(56) References Cited

U.S. PATENT DOCUMENTS

| | | | |
|---|---|---|---|
| 4,949,248 A | 8/1990 | Caro | 364/200 |
| 5,684,950 A | 11/1997 | Dare et al. | 395/187.01 |
| 6,230,201 B1 | 5/2001 | Guck et al. | 709/228 |
| 6,721,746 B2 | 4/2004 | Zulpa et al. | 707/10 |
| 7,035,819 B1 | 4/2006 | Gianakouros et al. | |
| 7,356,500 B1 | 4/2008 | Waelbroeck et al. | |
| 2002/0091615 A1 | 7/2002 | Salvani | 705/37 |
| 2002/0133448 A1 | 9/2002 | McGarry et al. | |
| 2003/0088499 A1 | 5/2003 | Gilbert et al. | |
| 2005/0021836 A1 | 1/2005 | Reed et al. | |
| 2005/0108143 A1 | 5/2005 | Beadle et al. | |

FOREIGN PATENT DOCUMENTS

| | | |
|---|---|---|
| EP | 1 262 894 A1 | 12/2002 |
| GB | 2425197 B | 12/2007 |
| WO | WO 95/06918 | 3/1995 |

OTHER PUBLICATIONS

Notification of Transmittal of the International Search Report, International Application No. PCT/US04/36125, Jan. 18, 2006, 2 pages.
Written Opinion of the International Searching Authority, International Application No. PCT/US04/36125, 3 pages.

(Continued)

Primary Examiner—Daniel S Felten
(74) Attorney, Agent, or Firm—Ruth J. Ma

(57) ABSTRACT

According to one embodiment, a method of managing access to a trading network is provided. A first network login request for a first user is received from a client application. The first network login request includes first authentication information. Based at least on the first authentication information, the first network login request is approved, which authorizes the first user to access the trading network. One or more associated users for which the first user is authorized to act as a proxy is identifying from a plurality of users. User profile information for one of the associated users is obtained and communicated to the client application. The user profile information includes information regarding the second user that can be used to allow the first user to engage in trading activity via the trading network on behalf of the second user.

29 Claims, 9 Drawing Sheets

OTHER PUBLICATIONS

UK Patent Office Examination Report for Application No. GB0609877.6, 4 pages.

PCT Notification of Transmittal of the International Search Report and the Written Opinion of the International Searching Authority, or the Declaration, re International Application No. PCT/US04/36014 filed Oct. 28, 2004, 8 pages, Dec. 15, 2005.

*European Communication* for Application No. 04819040.9; 3 pages, Feb. 15, 2007.

*European Patent Office Examination Report* for Application No. 04 819 040.9-1238; 5 pages, Oct. 24, 2007.

U.S. Appl. No. 10/716,305, filed Nov. 18, 2003, Beadle, et al.

USPTO Office Action for U.S. Appl. No. 10/716,305, filed Aug. 6, 2008 (59 pages).

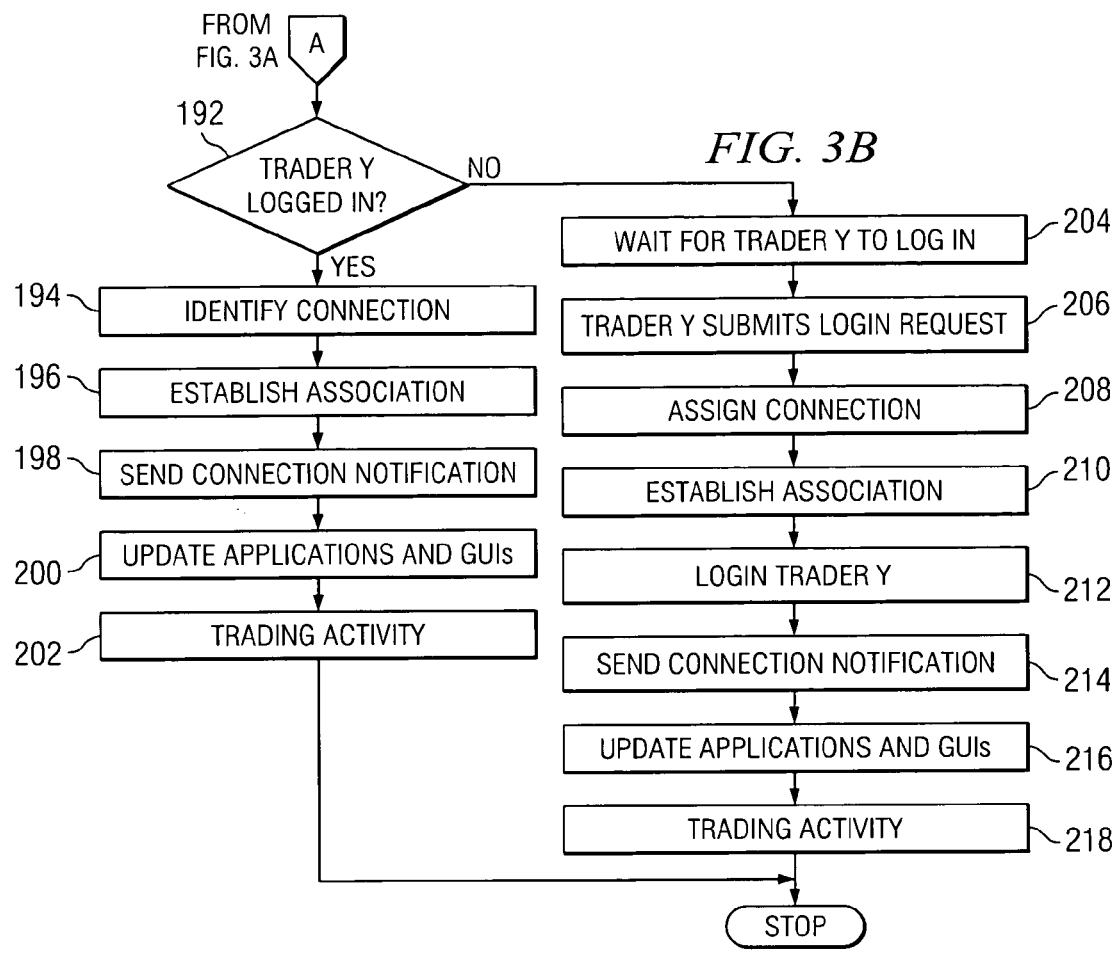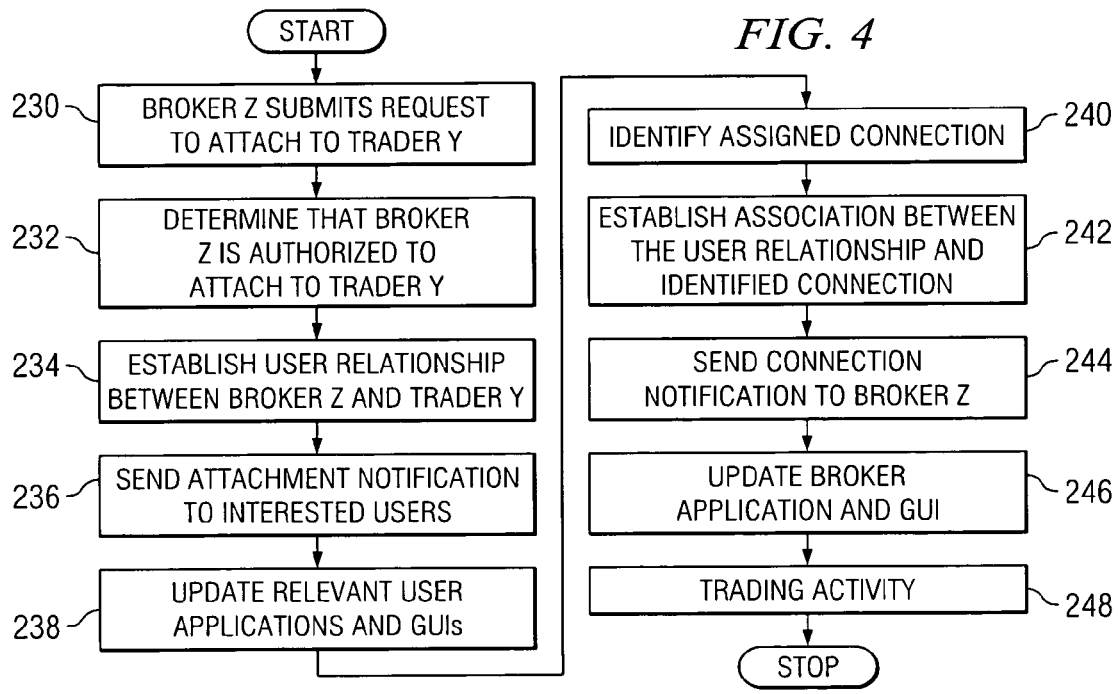

| USER ID 302 | PASSWORD 304 | BROKER/ TRADER 306 | MANAGED/ UNMANAGED 308 | USER RELATIONSHIPS 310 | ACTIVE/ PASSIVE 312 | PERMITTED TRADING SYSTEMS 314 | LOGGED IN? 316 |
|---|---|---|---|---|---|---|---|
| rjones | hotrod | BROKER | N/A | james02, emilyjohnson, mackey99 | N/A | 1,2,3,4,6,8 | Y |
| bfsmith | billyboy | BROKER | N/A | james02, mikebrown, mackey99, kjwalters | N/A | 1,3,4,5,6,7,8 | N |
| james02 | 031472 | TRADER | MANAGED | rjones, btsmith, williamliles | ACTIVE | 3,4,8 | N |
| mikebrown | happytrader | TRADER | MANAGED | btsmith, williamliles | PASSIVE | 3,4,6,8 | Y |
| mm3219 | smiley74 | TRADER | UNMANAGED | N/A | N/A | 1,2,3,4,5,6,7,8 | Y |
| ... | ... | ... | ... | ... | ... | ... | ... |

| TRADER ID 332 | MANAGED/ UNMANAGED 334 | ACTIVE/ PASSIVE 336 | LOGGED IN TO NETWORK 338 | CONNECTED TO TRADING SYSTEM 340 | CONNECTION 342 | ATTACHED BROKERS 344 | BROKER GATEWAYS 346 |
|---|---|---|---|---|---|---|---|
| james82 | MANAGED | PASSIVE | N | Y | 335 | rjones | A13 |
|  |  |  |  |  |  | tdwinston | A22 |
|  |  |  |  |  |  | benjamin22 | A8 |
| kellypatrick | UNMANAGED | N/A | Y | N | 281 | N/A | N/A |
| mikebrown | MANAGED | ACTIVE | N | N | N/A | tdwinston | A22 |
|  |  |  |  |  |  | benjamin22 | A8 |
| jbriley | MANAGED | ACTIVE | Y | Y | 175 | rjones | A13 |
|  |  |  |  |  |  | benjamin22 | A8 |
|  |  |  |  |  |  | frankscott | A15 |
| ... | ... | ... | ... | ... | ... | ... | ... |

SYSTEM AND METHOD FOR MANAGING RELATIONSHIPS BETWEEN BROKERS AND TRADERS

TECHNICAL FIELD OF THE INVENTION

This invention relates in general to trading markets and, more particularly, to a system and method for managing relationships between brokers and traders in a trading network.

BACKGROUND OF THE INVENTION

In order to engage in trading activity with a trading exchange, such as a stock exchange for example, traders have traditionally used brokers to assist them with transactions in the trading exchange. A broker has access to the trading exchange and acts as a middleman between a trader and the trading exchange, thus interacting with the trading exchange on behalf of the trader, such as to place, modify, monitor, or cancel various trading orders for various tradable instruments. Thus, the trader does not need direct access to the trading exchange and does not need to spend their time monitoring the trading exchange and, in particular, their existing trading orders.

In recent years, as investors have become more self-sufficient and comfortable with computers, online trading has gained a widespread acceptance for trading. For example, online trading systems have been created which facilitate the trading of financial instruments such as stocks, bonds, currency, futures, or other suitable financial instruments. Using such systems, investors may have direct access to their accounts information and may initiate transactions nearly instantaneously and, in some cases, 24 hours a day.

SUMMARY OF THE INVENTION

In accordance with the present invention, systems and methods for managing relationships between brokers and traders in a trading network are provided. According to one embodiment, a method of managing access to a trading network is provided. A first network login request for a first user is received from a client application. The first network login request includes first authentication information. Based at least on the first authentication information, the first network login request is approved, which authorizes the first user to access the trading network. One or more associated users for which the first user is authorized to act as a proxy is/are identified from a plurality of users. User profile information for one of the associated users is obtained and communicated to the client application. The user profile information includes information regarding the second user that can be used to allow the first user to engage in trading activity via the trading network on behalf of the second user.

According to another embodiment, another method of managing access to a trading network is provided. An attachment request from a client application associated with a first user is received at a broker proxy server. The attachment request includes a request to attach the first user to a second user and indicates whether the second user is a passive trader or an active trader. A user relationship between the first user and the second user is established and stored. If the attachment request indicates that the second user is a passive trader, an association is established between the user relationship and a first connection between the broker proxy server and a trading system. The established user relationship and the established first association allow the first user to engage in trading activity in the trading system on behalf of the second user via the first connection. Alternatively, if the attachment request indicates that the second user is an active trader, it is determined whether the second user is logged into the trading system. If it is determined that the second user is logged into the trading system, a second association is established between the user relationship and a second connection between the broker proxy server and the trading system. The established user relationship and the established second association allow the first user to engage in trading activity in the trading system on behalf of the second user via the second connection.

Various embodiments of the present invention may benefit from numerous advantages. It should be noted that one or more embodiments may benefit from some, none, or all of the advantages discussed below.

One advantage of the invention is that an electronic trading network is provided in which one or more brokers may engage in trading activity in a trading system, such as a trading exchange for a particular type of instrument, on behalf of a particular trader. For example, supposing a broker permitted to act on behalf of the particular trader places a trading order in the trading system on behalf of the particular trader, another broker that is also permitted to act on behalf of the particular trader may manage the trading order, which may include changing or canceling the trading order, for example. In this manner, multiple brokers may manage a single trader via an electronic network.

Another advantage of the present invention is that a broker proxy server establishes and manages relationships between brokers and traders that are used to route messages between users (brokers and traders) and a trading system. As a result, messages sent from the trading system regarding trading orders associated with a particular trader may be routed to the proper users, which may include the particular trader as well as each interested broker (such as, for example, each broker that is permitted to act on behalf of the particular trader).

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 4 illustrates an example method of a second broker "attaching" to the same managed trader in accordance with an embodiment of the present invention;

FIG. 6 illustrates an example table stored in association with an authentication manager of the network of FIG. 1 in accordance with one embodiment of the invention;

FIG. 7 illustrates an example table stored in association with a broker proxy server of the network of FIG. 1 in accordance with one embodiment of the invention;

DETAILED DESCRIPTION OF THE DRAWINGS

Example embodiments of the present invention and their advantages are best understood by referring now to FIGS. 1 through 9 of the drawings, in which like numerals refer to like parts.

In general, an electronic trading network is provided in which one or more brokers may collectively or simultaneously manage trading orders on behalf of a managed trader. For example, if a first broker that is permitted to act on behalf of the managed trader places a trading order at a trading system (such as a stock market, for example) on behalf of the particular trader, a second broker that is also permitted to act on behalf of the managed trader may manage the trading order (which may include changing or canceling the trading order, for example) as well as place other trading orders at the trading system. Thus, multiple brokers may manage a single trader via an electronic network.

Figure 1:
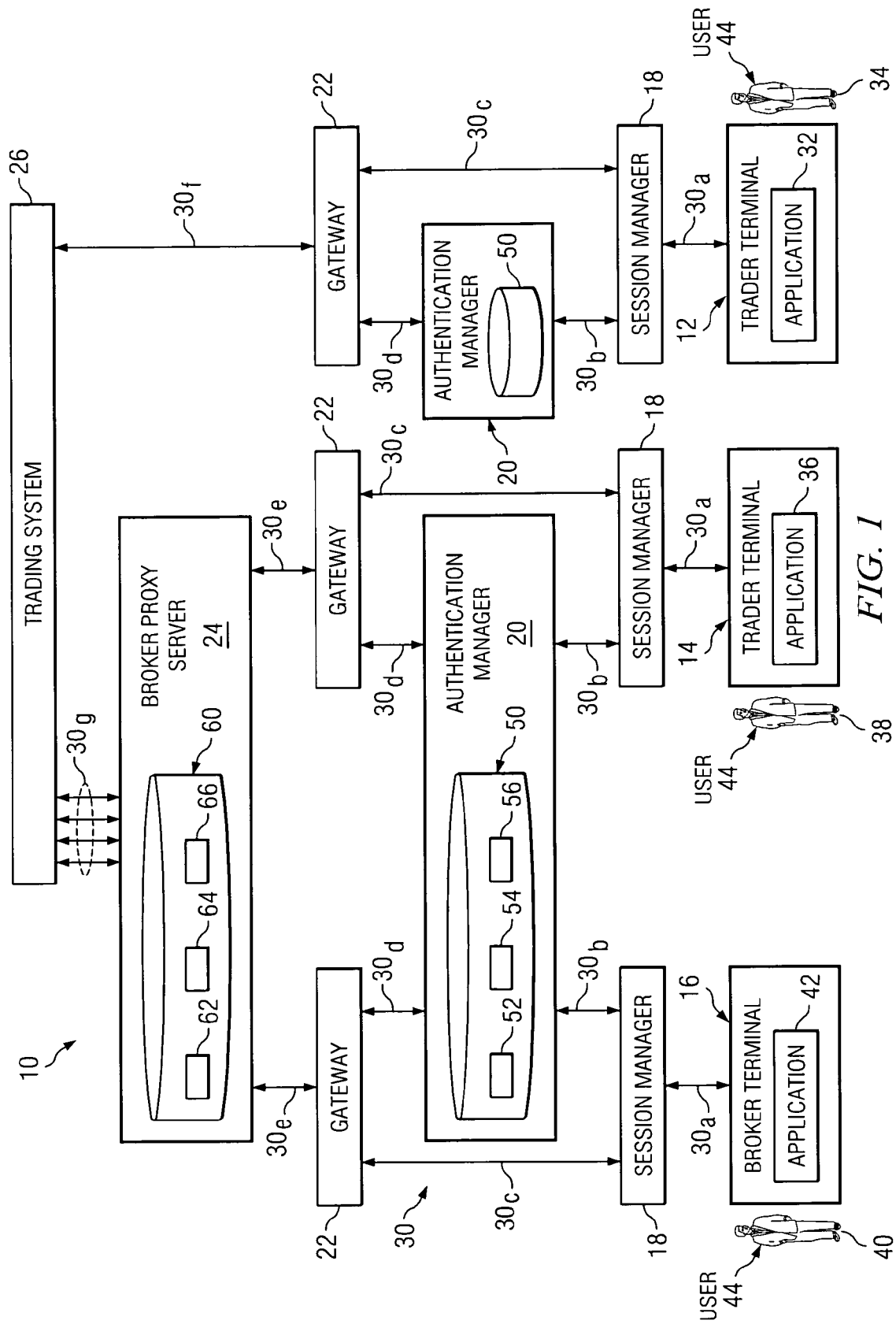
FIG. 1 illustrates an example trading network in which brokers are allowed to engage in trading activity on behalf of managed traders according to an embodiment of the present invention.

FIG. 1 illustrates an example trading network 10 in which brokers are allowed to engage in trading activity on behalf of managed traders according to an embodiment of the present invention. As shown, network 10 includes one or more unmanaged trader terminals 12, managed trader terminals 14, broker terminals 16, session managers 18, authentication managers 20, gateways 22, broker proxy servers 24 and trading systems 26. Each component of network 10 may include any hardware, software or combination thereof suitable to perform the functions of such components discussed herein. The components of trading network 10 are connected by various communication links 30a through 30g. Collectively, links 30a through 30g may be referred to as communication network 30. Communication network 30, or various communication links 30a through 30g, may include one or more local area networks (LANs), metropolitan area networks (MANs), wide area networks (WANs), wireless local area networks (WLANs), virtual private networks (VPNs), intranets, portions of the Internet, or any other appropriate wireline, optical, wireless, or other links suitable to facilitate communication of data in a network environment. Any of the various components of trading network 10 may be co-located with, or physically and/or geographically distributed from, any other components of trading network 10. In addition, various components of trading network 10 may be completely or partially integrated with each other.

Each unmanaged trader terminal 12 hosts an unmanaged trader application 32 that provides an unmanaged trader 34 access to engage in trading activity via one or more trading systems 26 of trading network 10. Each unmanaged trader terminal 12 and application 32 may include a computer system and appropriate software to allow unmanaged trader 34 to engage in trading activity via trading network 10. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. An unmanaged trader terminal 12 may also include one or more human interfaces, such as a mouse, keyboard, or pointer, for example.

An unmanaged trader 34 is a trader (such as an individual or group of individuals) that may engage in trading activity via trading network 10 on behalf of itself. For example, an unmanaged trader 34 may manage trading orders via one or more trading systems 26 on its own behalf (in other words, without using a broker). In this manner, an unmanaged trader 34 may trade with other traders 34 and/or 38 via one or more trading systems 26.

As used throughout this document, "managing" a trading order includes determining the parameters of a new trading order (such as the instrument, price, size, and type of order), submitting a new trading order, monitoring an existing trading order, altering an existing trading order (such as changing the price, size, or type of the order, for example), canceling an existing trading order and/or any other any suitable functions regarding a new or existing trading order in a trading system. In addition, as used throughout this document, "engaging in trading activity" includes at least managing trading orders.

Similar to unmanaged trader terminals 12, each managed trader terminal 14 hosts a managed trader application 36 that provides a managed trader 38 access to engage in trading activity via one or more trading systems 26 of trading network 10. Each managed trader terminal 14 and application 36 may include a computer system and appropriate software to allow managed trader 38 to engage in trading activity via trading network 10.

A managed trader 38 is a trader (such as an individual or group of individuals) that may engage in trading activity via trading network 10 on behalf of itself, as well as authorizing one or more brokers 40 to engage in trading activity on behalf of the managed trader 38. For example, a managed trader 38 may manage trading orders via one or more trading systems 26 on its own behalf, as well as authorizing one or more brokers 40 to manage trading orders via such trading systems 26 on behalf of the managed trader 38. In this manner, a managed trader 38 may trade with other traders 34 and/or 38 via one or more trading systems 26.

Each broker terminal 16 hosts a broker application 42 that provides a broker 40 access to engage in trading activity on behalf of one or more managed traders 38 via trading network 10. Broker terminal 16 and broker application 42 may include a computer system and appropriate software to allow broker 40 to engage in trading activity via trading network 10.

In some embodiments, a broker 40 is an individual, group of individuals, or other entity that is authorized to engage in trading activity via trading network 10 on behalf of one or more managed traders 38, but not on its own behalf. For example, a broker 40 may manage trading orders via one or more trading systems 26 on behalf of a number of managed traders 38, but not on its own behalf. Thus, in such embodiments, a broker 40 may not trade on its own behalf with other brokers 40 or traders 34 or 38 via trading systems 26. In other embodiments, a broker 40 may be permitted to act as a broker as well as a trader. In such embodiments, a broker 40 may manage trading orders via one or more trading systems 26 on behalf of managed traders 38, as well as on its own behalf.

For a broker 40 authorized to act on behalf of a managed trader 38, trading network 10 generally allows the broker 40 to manage trading orders collectively or simultaneously with the managed trader 38, as well as with other brokers 40 authorized to act on behalf of the managed trader 38. Thus, if broker 40 and the managed trader 38 are logged into a trading system 26, both the broker 40 and the managed trader 38 may manage trading orders in the trading system 26 on behalf of the managed trader 38, including managing different trading orders as well as the same trading orders. For example, if the broker 40 places a trading order in the trading system 26 on behalf of the managed trader 38, the managed trader 38 may manage the trading order (such as altering or canceling the trading order, for example), as well as place other trading orders in the trading system. Thus, the broker 40 and the managed trader 38 may co-manage trading orders on behalf of the managed trader 38.

Similarly, if multiple brokers 40 that are each permitted to act on behalf of a managed trader 38 are logged into a trading system 26, each of the brokers 40 may manage trading orders in the trading system 26 on behalf of the managed trader 38, including managing different trading orders as well as the same trading orders. For example, if a first broker 40 that is permitted to act on behalf of the managed trader 38 places a trading order at the trading system 26 on behalf of the managed trader 38, a second broker 40 that is also permitted to act on behalf of the managed trader 38 may manage the trading order (such as changing or canceling the trading order, for example), as well as place other trading orders at the trading system on behalf of the managed trader 38. In this manner, multiple brokers may co-manage trading orders on behalf of a managed trader 38.

Each managed trader 38 may be either an active trader or a passive trader. A broker 40 may engage in trading activity on behalf of a passive trader regardless of whether the passive trader is actually logged into trading network 10, while a broker 40 may engage in trading activity on behalf of an active trader only if the active trader is actually logged into trading network 10.

Brokers 40, managed traders 38 and unmanaged traders 36 may collectively be referred to as users 44 of trading network 10. It should be understood that in alternative embodiments, the relationships described herein between brokers 40, managed traders 38 and unmanaged traders 36 may apply similarly between other types of users of trading network 10. For example, in one alternative embodiment, one trader 34 or 38 may have a broker-trader relationship with another trader 34 or 38.

Applications 32, 36 and 42 may be referred to as client applications and may include front-end applications that can connect with session managers 18 in order to access trading network 10. A session manager 18 generally manages communication sessions between an application 32, 36 or 42 and other portions of trading network 10. In the embodiment shown in FIG. 1, session manager 18 cooperates at least with an application 32, 36 or 42, authentication manager 20, and gateways 22 to provide a user 44 access to trading systems 26. For example, session manager 18 may establish and/or manage connections with particular gateways 22 allowing communications between an application 32, 36 or 42 and particular trading systems 26. In some embodiments, a particular session manager 18 may be connected to a number of applications 32, 36 or 42 such that a number of users 44 may access trading network 10 via the particular session manager 18.

An authentication manager 20 generally manages the authentication of users 44 attempting to login to trading network 10. Authentication manager 20 may include memory 50 that may store, for each user of network 10, user login, or authentication, data 52, user profile data 54, and user relationship data 56. User login data 52 includes various information, such as login IDs and passwords, associated with authorizing a user 44 access to network 10. User profile data 54 includes various information regarding the respective user, such as which trading systems 26 in which that user 44 is permitted to trade, which types of orders that user 44 is permitted to submit, and for managed traders 38, whether the trader 38 is an active or passive trader, for example. User relationship data 56 identifies, for each broker 40, the managed traders 38 for which that broker 40 is authorized to engage in trading activity on behalf of via network 10, and for each managed trader 38, the one or more brokers 40 that are authorized to act on behalf of that managed trader 38. Thus, user relationship data 56 defines a number of broker-trader relationships between brokers 40 and managed trader 38.

Memory 50 may include one or more suitable databases or memory devices, such as one or more SYBASE™ databases, INGRESS™ databases, ORACLE™ databases, random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), or electrically erasable programmable read-only memories (EEPROMs), for example.

An authentication manager 20 manages the authentication of users 44 attempting to login to trading network 10 at least by comparing login information received from an application 32, 36 or 40 with appropriate user login data 52 stored in memory 50. An authentication manager 20 also provides functionality for managing broker-trader relationships, including managing access for a broker 40 to act on behalf of its associated managed traders 38. For example, as described in greater detail below with reference to FIG. 2, during or after the login of a broker 40, an authentication manager 20 may provide the broker 40 (or the broker application 42 or session manager 18 associated with that broker 40) a list of managed traders 38 for which the broker 40 is authorized to act on behalf of, as well as a list of each trading system 26 in which each of such managed traders 38 is permitted to trade, based on user profile data 54 and user relationship data 56. In some embodiments, the authentication manager 20 may also identify for the session manager 18 associated with the broker 40, the appropriate gateways 22 through which particular trading systems 26 may be accessed.

Gateways 22 are intermediate nodes within trading network 10 that may provide a connection from a session manager 18 to a trading system 26 (for example, see communication link 30f), or to a broker proxy server 24 which is connected to a trading system 26 (for example, see communication links 30e and 30g).

A broker proxy server 24 manages user relationships between brokers 40 and managed traders 38 and routes messages to and from trading systems 26 according to such user relationships. The broker proxy server 24 manages the "attachment" of brokers 40 to managed traders 38 which allows the brokers 40 to engage in trading activity with one or more trading systems 26 on behalf of such "attached" managed traders 38. As described in greater detail below with reference to FIG. 3, attachment includes establishing an appropriate connection between a gateway 22 and a trading system 26 which allows communication between a broker application 42 and the trading system 26 so that a broker 40 using the broker application 42 can engage in trading activity via the trading system 26 on behalf of a managed trader 38.

Each broker proxy server 24 includes memory 60 that may store user relationship data 62, connection data 64 and user status data 66. User relationship data 62 may include any number of user relationships between a managed trader 38 and a broker 40 that is currently "attached" to that managed trader 38. Connection data 64 may include data identifying connections between broker proxy server 24 and trading system 26, as well as associations between such connections and user relationships that have been established. User status data 66 may include data regarding the current status of various users 44 of trading network 44, such as whether each user 44 is logged into network 10 and further whether each user 44 is logged into trading system 26. Memory 60 may include one or more suitable databases or memory devices, such as described above with reference to memory 50.

In some embodiments, communication links 30a through 30g may provide various channels of communications via network 10. For example, in one embodiment, such communication channels include a market data channel for communicating data such as market data and trading orders, and an administration channel for communicating administrative or control data. In this embodiment, broker proxy server 24 provides a proxy between a gateway 22 and a trading system 26 only for the administration channel, and the gateway 22 continues to connect directly to the trading system 26 market data channel or to a proxy of the market data channel provided by the trading system 26.

A trading system 26 may manage trading transactions between users 44 of network 10. For example, a trading system 26 may receive trading orders (such as orders to buy or sell a particular instrument) from traders 34 and/or 38 and to manage or process those trading orders such that financial transactions among and between traders 34 and/or 38 are performed. A trading system 26 may include or communicate with one or more market centers, which may comprise all manner of order execution venues including exchanges, Electronic Communication Networks (ECNs), ATFs and market makers. A market center maintains a bid and offer price in a given trading product by standing ready, willing, and able to buy or sell at publicly quoted prices.

In some embodiments, each trading system 26 represents a different market. For example, different trading systems 26 within trading network 10 may be provided for trading different types of instruments, such as NYSE stocks, US Treasuries, or Japanese government bonds, for example. In some embodiments, each broker 40 and each trader 34 and 38 is permitted to trade in particular ones (or all) of the trading systems 26 within trading network 10, based on a variety of factors.

Broker Login

Figure 2:
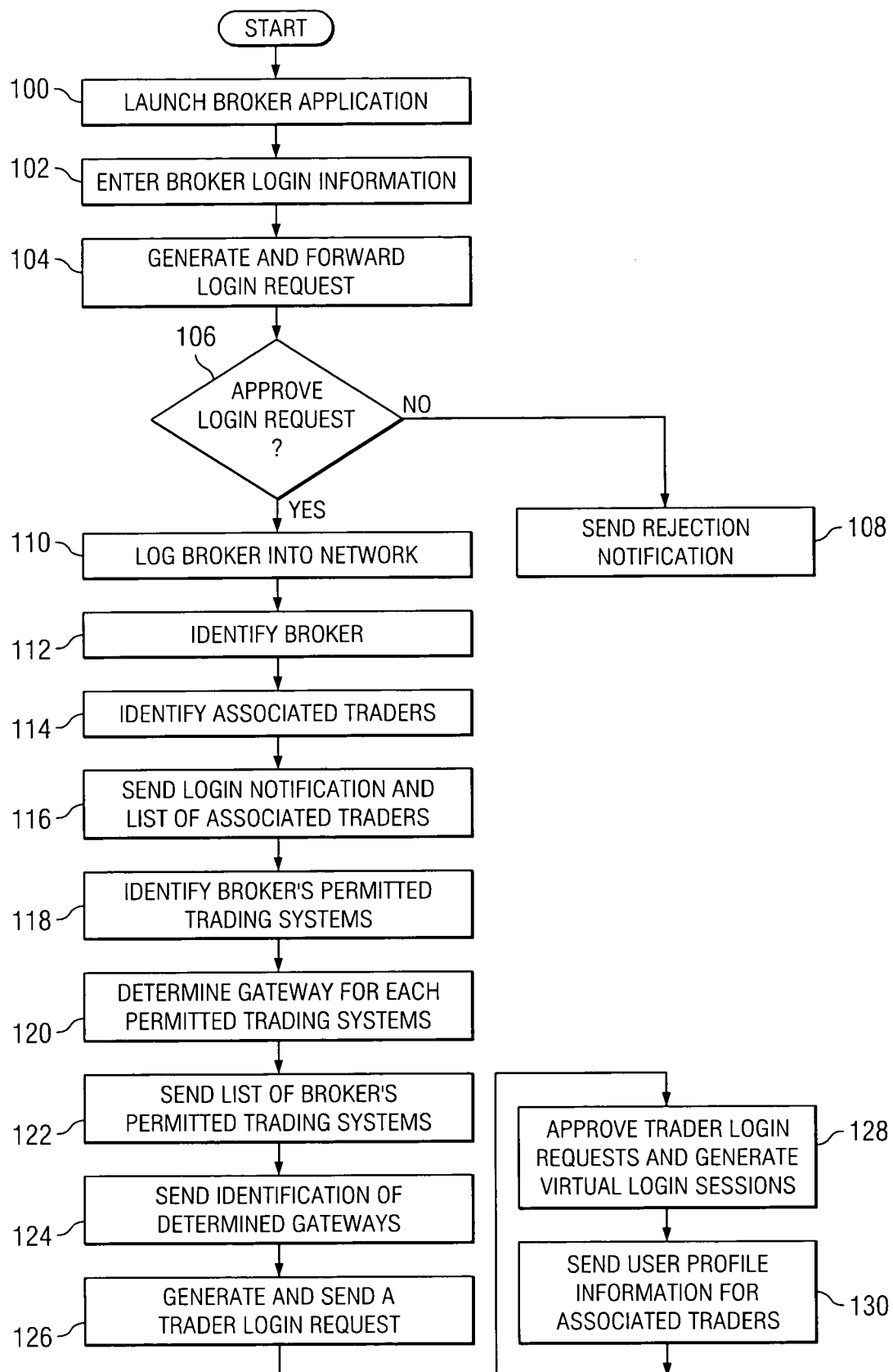
FIG. 2 illustrates an example method of a broker logging into the network of FIG. 1 in accordance with an embodiment of the present invention.

FIG. 2 illustrates an example method of a broker 40 logging into network 10 in accordance with an embodiment of the present invention. At step 100, a broker 40, referred to herein as Broker X, uses a broker terminal 16 to launches a broker application 42 hosted by the broker terminal 16. At step 102, Broker X enters various authentication information such as a user ID and a password into an interface, such as a graphical user interface (GUI), provided by broker application 42. At step 104, broker application 42 forwards a network login request including the authentication information to an authentication manager 20. The network login request is a request to log Broker X into trading network 10 such that Broker X has access to trading network 10.

At step 106, authentication manager 20 determines whether to approve the network login request based at least on the authentication information (for example, a user ID and password) included in the network login request. To make this determination, authentication manager 20 may compare the authentication information received in the network login request with user login data 52 stored in memory 50. If the authentication manager 20 rejects the network login request, a notification that the network login request was rejected is communicated to broker application 42 at step 108 to inform Broker X. However, if the authentication manager 20 approves the network login request, execution proceeds to step 110, where authentication manager 20 logs Broker X into network 10.

At step 112, authentication manager 20 identifies that the network login request was submitted by a broker 40 (namely, Broker X), such as based on authentication information included in the broker's network login request. At step 114, as a result of identifying that the network login request was received from a broker 40, authentication manager 20 identifies, based on user relationship data 56 stored in memory 50, each managed trader 38 for which Broker X is authorized to engage in trading activity on behalf of. These managed traders 38 are referred to herein as associated traders 38. Authentication manager 20 communicates a login notification, as well as the list of identified associated traders 38, to broker application 42 at step 116. The login notification indicates that the network login request for Broker X was approved and that Broker X was logged into trading network 10. The list of identified associated traders 38 communicated to broker application 42 includes an indication of whether each associated trader 38 is an active or passive trader.

In addition, at step 118, authentication manager 20 identifies, based on user profile data 54 regarding Broker X, each trading system 26 to which Broker X is authorized access (such as for engaging in trading activity on behalf of associated traders 38). At step 120, for each identified trading system 26, authentication manager 20 determines a gateway 22 through which broker application 42 may access that trading system 26. At step 122, authentication manager 20 communicates to broker application 42 the list of trading systems 26 to which Broker X is authorized access. At step 124, authentication manager 20 communicates to the session manager 18 associated with the broker application 42 the gateway 22 determined for each trading system 26 to which Broker X is authorized access.

At step 126, broker application 42 generates and communicates to authentication manager 20 a network login request for each identified associated trader 38. The network login request for each associated trader 38 includes a request to authenticate one of the associated traders 38. In this embodiment, network login requests for each associated trader 38 are automatically generated and submitted to authentication manager 20 for approval. In an alternative embodiment, network login requests for each associated trader 38 are generated in response to commands entered by Broker X. The network login request for each associated trader 38 may include authentication information associated with the associated trader 38, such that the authentication manager 20 may perform an authentication of the associated trader 38. Such authentication information may have been received by broker application 42 from authentication manager 20 during the login process for Broker X. Alternatively, at least a portion of the required authentication information included in the network login request for each associated trader 38 is manually entered by Broker X, which may provide an additional level of security.

At step 128, authentication manager 20 approves the network login request for each associated trader 38 and generates a virtual login session for that associated trader 38. The virtual login session for an associated trader 38 is distinct from whether or not that associated trader 38 is actually logged in to network 10 on its own behalf. As a result of approving the network login request for each associated trader 38, authentication manager 20 retrieves user login data 52 and user profile data 54 regarding each associated trader 38 from memory 50 and communicates the retrieved user profile data 54 to broker application 42 at step 130. The user login data 52 for each associated trader 38 includes various information, such as login IDs and passwords, associated with authorizing such associated traders 38 access to network 10. The user profile data 54 communicated to broker application 42 for each associated trader 38 includes information regarding that trader 38 that can be used to allow Broker X to engage in trading activity via trading network 10 on behalf of that trader 38. For example, user profile data 54 communicated to broker application 42 for each associated trader 38 may identify (1) each trading system 26 to which the trader 38 is permitted access for trading activity, (2) one or more parameters defining the permitted trading activity for the trader 38 in each of such trading systems 26, and/or (3) whether the trader 38 is a passive trader or an active trader.

Attachment

Figure 3A:
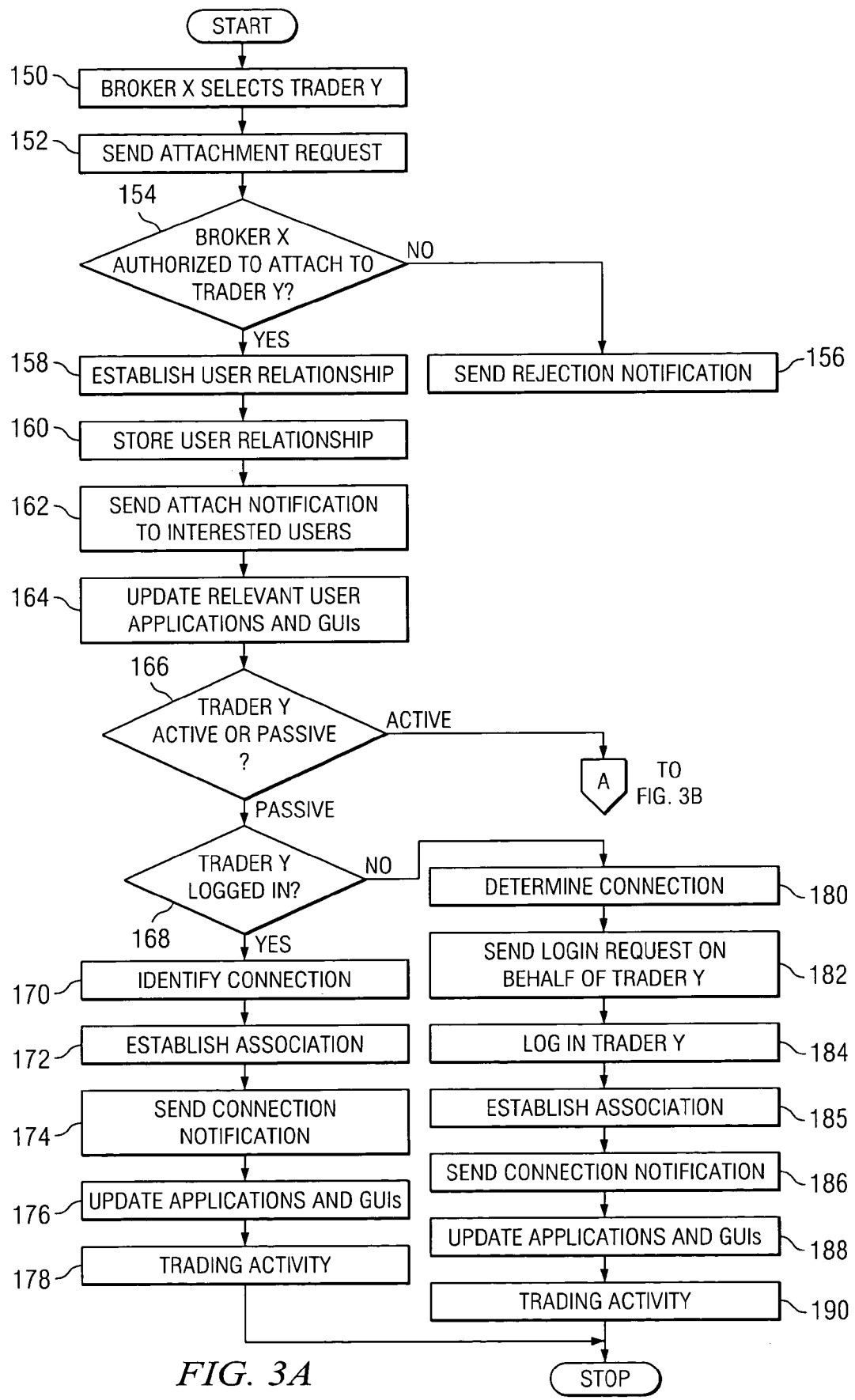
FIG. 3 illustrates an example method of a first broker "attaching" to a managed trader in accordance with an embodiment of the present invention.

FIG. 3 illustrates an example method of Broker X "attaching" to a managed trader 38 in accordance with an embodiment of the present invention. The method shown in FIG. 3 may follow or occur subsequent to the method shown in FIG. 2.

At step 150, Broker X selects, via a GUI provided by broker application 42, one of the associated traders 38 that Broker X wishes to trade or otherwise act on behalf of in a particular trading system 26. The selected trader 38 is referred to herein as Trader Y. At step 152, broker application 42 generates and communicates to broker proxy server 24 an attachment request to "attach" to Trader Y for the particular trading system 26. The attachment request comprises a request to establish and store a relationship between Broker X and Trader Y. The attachment request includes an indication of whether Trader Y is an active trader or a passive trader.

At step 154, broker proxy server 24 determines whether Broker X is authorized to attach to Trader Y (in other words, whether Broker X is authorized to act as a broker on behalf of Trader Y). This may involve broker proxy server 24 communicating an attachment authorization query to authentication manager 20 which identifies Broker X and Trader Y, and receiving from the authentication manager 20 a determination (based on user relationship data 56) of whether Broker X is authorized to engage in trading activity on behalf of Trader Y. If broker proxy server 24 determines that Broker X is not authorized to attach to Trader Y, broker proxy server 24 rejects the attachment request and notifies broker application 42 accordingly at step 156. However, if broker proxy server 24 determines that Broker X is authorized to attach to Trader Y, the method continues to step 158. In some embodiments, broker proxy server 24 assumes that all attachment requests received from broker applications 38 are valid, and automatically approves such requests. In such embodiments, step 154 is not performed.

At step 158, broker proxy server 24 attaches Broker X to Trader Y by establishing a user relationship between Broker X and Trader Y. The established user relationship is stored in table 60 as user relationship data 62 at step 160. User relationship data 62 may also include user relationships between Trader Y and each other broker 40 that is currently attached to Trader Y. In addition, user relationship data 62 may also include user relationships between Broker X and other selected traders 38 to which Broker X has already attached. At step 162, broker proxy server 24 communicates an attachment notification to all interested users 44, including (1) the broker application 42 associated with Broker X; (2) the trader application 36 associated with Trader Y; and (3) the broker applications 42 associated with other brokers 40 monitoring the status of Trader Y, if any, which may include all other brokers 40 currently attached to Trader Y or all other brokers 40 logged in to network 10 who are permitted to act on behalf of Trader Y. The attachment notification indicates that Broker X has attached to Trader Y. At step 164, the relevant broker application(s) 42 and trader application 36 are updated to indicate to respective broker(s) 40 and Trader Y that Broker X has attached to Trader Y, such as by updating a GUI display, for example.

In order for Broker X to engage in trading activity via the particular trading system 26 on behalf of Trader Y, a connection between the broker proxy server 24 is assigned to the user relationship between Broker X and Trader Y. The manner in which such a connection is assigned depends on whether Trader Y is an active trader or a passive trader. Thus, at step 166, broker proxy server 24 determines whether Trader Y is an active trader or a passive trader based on information included in the attachment request.

If Trader Y is a passive trader, the method continues to step 168. At step 168, broker proxy server 24 determines whether Trader Y is already logged in to the particular trading system 26, such as based on the current user status data 66 stored in memory 60. If Trader Y is currently logged into the particular trading system 26, broker proxy server 24 identifies the particular connection 30g through which Trader Y is connected to the particular trading system 26 at step 170. At step 172, broker proxy server 24 establishes and stores as connection data 64 an association between the user relationship between Broker X and Trader Y (established at step 158) and the connection 30g identified at step 170. Thus, when Broker X subsequently sends a message to the particular trading system 26 on behalf of Trader Y, broker proxy server 24 may intercept the message, identify the user relationship between Broker X and Trader Y, identify the appropriate connection 30g associated with the user relationship at step 170, and forward the message to the trading system via the identified connection 30g.

At step 174, broker proxy server 24 communicates a connection notification to all interested users 44, including: (1) the broker application 42 associated with Broker X; (2) the trader application 36 associated with Trader Y; and (3) the broker applications 42 associated with other brokers 40 monitoring the status of Trader Y, if any, which may include all other brokers 40 currently attached to Trader Y or all other brokers 40 logged in to network 10 who are permitted to act on behalf of Trader Y. The connection notification indicates that Broker X is connected to trading system 26 on behalf of Trader Y. At step 176, the relevant broker application(s) 42 and trader application(s) 36 are updated to indicate to respective broker(s) 40 and Trader Y that Broker X is connected to trading system 26 on behalf of Trader Y, such as by updating a GUI display, for example. In particular, the broker application 42 associated with Broker X may provide a GUI allowing Broker X to engage in trading activity in trading system 26 on behalf of Trader Y.

Accordingly, at step 178, Broker X may now engage in trading activity in trading system 26 on behalf of Trader Y via broker application 42 and the connection 30g associated at step 170. Others brokers 40, if any, that are currently attached to Trader Y may continue to engage in trading activity in trading system 26 on behalf of Trader Y. Thus, at step 178, Trader Y, Broker X, and other brokers 40 currently attached to Trader Y may collectively engage in trading activity in trading system 26 on behalf of Trader Y, including collectively managing trading orders in trading system 26. For example, supposing that one of Trader Y, Broker X, or another broker 40 currently attached to Trader Y places a trading order at trading system 26 on behalf of Trader Y, any or all of Trader Y, Broker X, and other brokers 40 currently attached to Trader Y may adjust, cancel or otherwise manage the trading order on behalf of Trader Y.

Alternatively, if it is determined that Trader Y is not currently logged in to the particular trading system 26, at step 180, broker proxy server 24 determines a particular connection 30g through which to communicate with trading system 26. At step 182, broker proxy server 24 sends a trading system login request to the trading system 26 on behalf of Trader Y via the particular connection 30g. The trading system login request is a request to log Trader Y into the trading system 26 on behalf of Broker X. The trading system login request appears to the trading system 26 as if it was received from Trader Y itself. At step 184, the trading system 26 logs in Trader Y and communicates a login notification to broker proxy server 24 via the connection 30g used at step 182.

At step 185, broker proxy server 24 establishes and stores as connection data 64 an association between the user relationship between Broker X and Trader Y (established at step 158) and the connection 30g used at step 182. At step 186, broker proxy server 24 communicates a connection notification to all interested users 44, such as described above with reference to step 174. The connection notification indicates that Broker X is connected to trading system 26 on behalf of Trader Y. At step 188, the relevant broker application(s) 42 and trader application 36 are updated, such as described above with reference to step 176. Accordingly, at step 190, Broker X may now engage in trading activity in trading system 26 on behalf of Trader Y via the connection 30g used at steps 182 and 184. Thus, Trader Y, Broker X, and other brokers 40 currently attached to Trader Y may collectively engage in trading activity in trading system 26 on behalf of Trader Y, including collectively managing trading orders in trading system 26, as discussed above with reference to step 178.

Alternatively, if it is determined at step 166 that Trader Y is an active trader, the method continues to step 192. At step 192, broker proxy server 24 determines whether Trader Y is already logged in to the particular trading system 26, such as based on the current user status data 66 stored in memory 60. If Trader Y is currently logged in to the particular trading system 26, broker proxy server 24 identifies the particular connection 30g through which Trader Y is connected to the particular trading system 26 at step 194. At step 196, broker proxy server 24 establishes and stores as connection data 64 an association between the user relationship between Broker X and Trader Y (established at step 158) and the connection 30g identified at step 194. Thus, when Broker X subsequently sends a message to the particular trading system 26 on behalf of Trader Y, broker proxy server 24 may intercept the message, identify the user relationship between Broker X and Trader Y, identify the appropriate connection 30g associated with the user relationship at step 194, and forward the message to the trading system via the identified connection 30g.

At step 198, broker proxy server 24 communicates a connection notification to all interested users 44, such as described above with reference to step 174. At step 200, the relevant broker application(s) 42 and trader application 36 are updated, such as described above with reference to step 176. Accordingly, at step 202, Broker X may now engage in trading activity in trading system 26 on behalf of Trader Y via the connection 30g identified at step 194. Thus, Trader Y, Broker X, and other brokers 40 currently attached to Trader Y may collectively engage in trading activity in trading system 26 on behalf of Trader Y, including collectively managing trading orders in trading system 26, as discussed above with reference to step 178.

However, if it is determined at step 192 that Trader Y is not currently logged in to the particular trading system 26, broker proxy server 24 does not associate a connection 30g with the user relationship between Broker X and Trader Y (established at step 158). As a result, Broker X is unable to send messages to, or receive messages from, trading system 26 on behalf of Trader Y, at least until Trader Y logs into the trading system 26, as discussed below. Thus, at step 204, broker proxy server 24 waits for Trader Y to log into trading system 26. At some later time, at step 206, Trader Y (via the trader application 36 associated with Trader Y) submits a trading system login request to log into trading system 26, which trading system login request is intercepted by broker proxy server 24. At step 208, broker proxy server 24 assigns, or uses, a particular connection 30g to forward the trading system login request to the trading system 26. At step 210, broker proxy server 24 stores the particular connection 30g as connection data 64 and associates the particular connection 30g with the user relationship between Broker X and Trader Y that was established at step 158. At step 212, the trading system 26 logs Trader Y into the trading system 26 and communicates a login notification to broker proxy server 24 via the connection 30g used at step 208.

At step 214, broker proxy server 24 communicates a connection notification to all interested users 44, such as described above with reference to step 174. The connection notification indicates that Trader Y is connected to trading system 26. At step 216, the relevant broker application(s) 42 and trader application 36 are updated, such as described above with reference to step 176. Accordingly, at step 218, Broker X may now engage in trading activity in trading system 26 on behalf of Trader Y via the connection 30g used at steps 208 and 212. Thus, Trader Y, Broker X, and other brokers 40 currently attached to Trader Y may collectively engage in trading activity in trading system 26 on behalf of Trader Y, including collectively managing trading orders in trading system 26, as discussed above with reference to step 178.

FIG. 4 illustrates an example method of another broker 40 "attaching" to Trader Y in accordance with an embodiment of the present invention. The method shown in FIG. 4 may follow or occur subsequent to the method shown in FIG. 3. In some situations, after Broker X has been attached to Trader Y, other brokers 40 that are authorized to act on behalf of Trader Y may attach to Trader Y, as shown as steps 230 through 248.

At step 230, a second broker 40, referred to herein as Broker Z, submits an attachment request to "attach" to Trader Y, including a request to establish the requested connection. At step 232, broker proxy server 24 determines whether Broker Z is authorized to attach to Trader Y, such as described above with reference to steps 154 and 156 of FIG. 3. Assuming Broker Z is authorized to attach to Trader Y, broker proxy server 24 proceeds to the attachment process. At step 234, broker proxy server 24 attaches Broker Z to Trader Y by establishing and storing as user relationship data 62 a user relationship between Broker Z and Trader Y, such as described above with reference to steps 158 and 160 of FIG. 3. At step 236, broker proxy server 24 sends an attachment notification to interested users 44, including Broker Z, Broker X, Trader Y, and other interested brokers 40, such as described above with reference to step 162 of FIG. 3. The attachment notification indicates that Broker Z has attached to Trader Y. At step 238, the relevant user applications 36 and 42 are updated, such as described above with reference to step 164 of FIG. 3.

At step 240, broker proxy server 24 identifies that a particular connection 30g is currently assigned, or is being used, for communications between broker proxy server 24 and trading system 26 on behalf of Trader Y. Namely, the identified connection 30g is the connection 30g associated with the user relationship between Broker X and Trader Y at step 172, 185, 196, or 208 of the method of FIG. 3. At step 242, broker proxy server 24 establishes and stores as connection data 64 an association between the user relationship between Broker Z and Trader Y (established at step 234) and the connection 30g identified at step 240. Thus, when Broker Z subsequently sends a message to the particular trading system 26 on behalf of Trader Y, broker proxy server 24 may intercept the message, identify the user relationship between Broker Z and Trader Y, identify the appropriate connection 30g associated with the user relationship at step 242, and forward the message to the trading system via the identified connection 30g.

At step 244, broker proxy server 24 communicates a connection notification to the broker application 42 associated with Broker Z. The connection notification indicates that a connection 30g exists for communicating with trading system 26 on behalf of Trader Y. At step 246, the broker application 42 associated with Broker Z is updated to indicate that Broker Z may now place trading orders or otherwise engage in trading activity in trading system 26 on behalf of Trader Y. In particular, the broker application 42 associated with Broker Z may provide a GUI allowing Broker Z to engage in trading activity in trading system 26 on behalf of Trader Y. Accordingly, at step 248, Broker Z may now engage in trading activity in trading system 26 on behalf of Trader Y via the connection 30g associated with the user relationship at step 242. Thus, Broker Z, Broker X, Trader Y, and other brokers 40 currently attached to Trader Y may collectively engage in trading activity in trading system 26 on behalf of Trader Y, including collectively managing trading orders in trading system 26, as discussed above with reference to step 178.

Detachment and Re-Attachment

Figure 5:
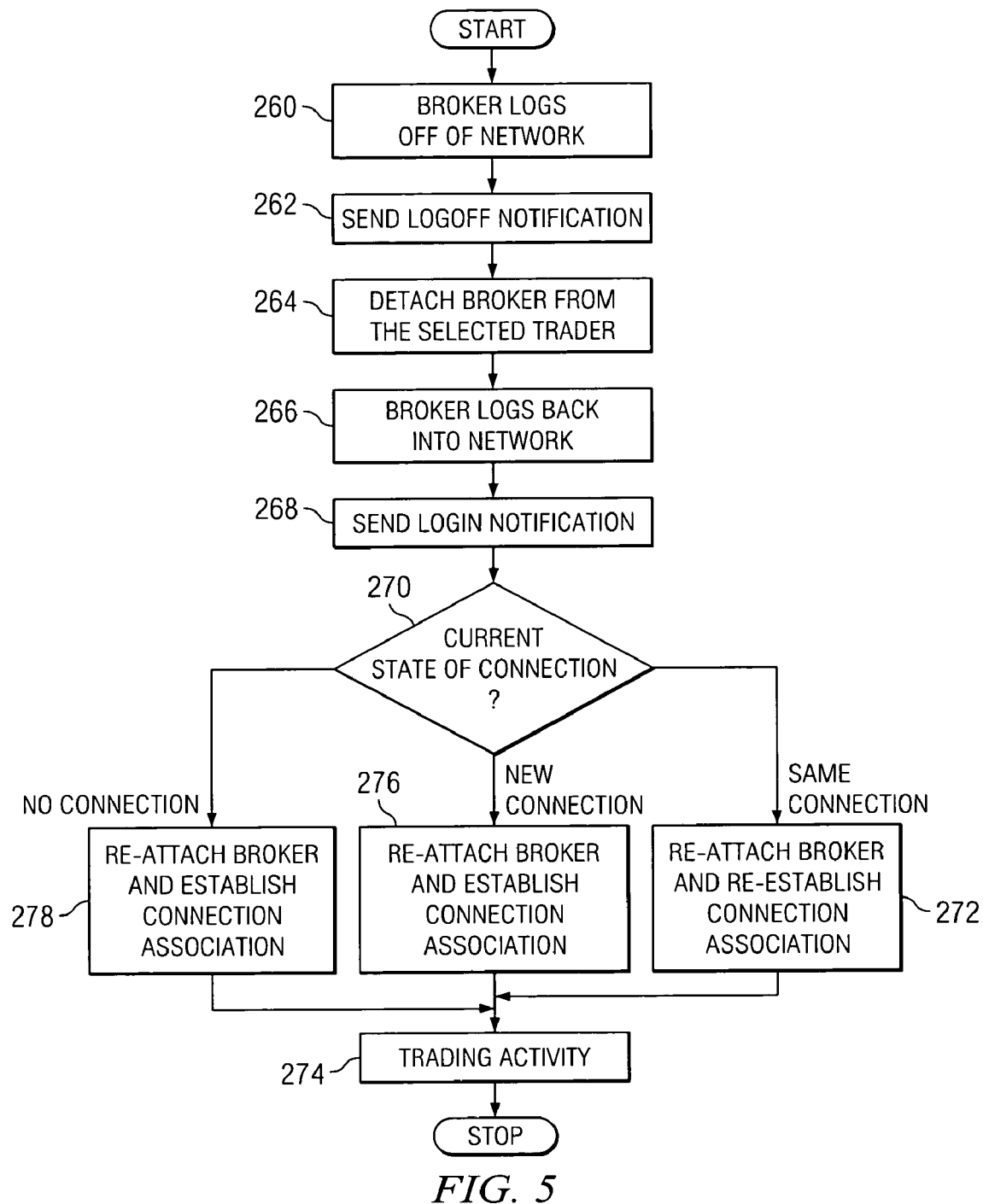
FIG. 5 illustrates an example method of a broker logging off and subsequently logging back in and "re-attaching" to a managed trader in accordance with an embodiment of the present invention.

FIG. 5 illustrates an example method of Broker X logging off and then logging back in to network 10 and "re-attaching" to a trader 38 in accordance with an embodiment of the present invention. The method shown in FIG. 5 may follow or occur subsequent to the method shown in FIG. 3 or FIG. 4.

At step 260, Broker X logs off of network 10, such as by selecting a "logoff" icon on a GUI display presented to Broker X by broker application 42. At step 262, broker application 42 communicates a logoff notification to broker proxy server 24 indicating that Broker X is logging off or has logged off of network 10. In response to receiving the logoff notification, broker proxy server 24 "detaches" Broker X from Trader Y at step 264, which includes deleting, writing over or otherwise removing the user relationship between Broker X and Trader Y established and stored in memory 60 at step 158 and 160 of the method shown in FIG. 3.

At step 266, Broker X logs back into network 10, which may include the performance of any or all of steps 100 through 130 discussed above with reference to the method of FIG. 2. At step 268, broker application 42 communicates a login notification to broker proxy server 24 indicating that Broker X is logging back on or has logged back on to trading network 10. In response to receiving the login notification, broker proxy server 24 automatically re-attaches Broker X to each managed trader 38 to which Broker X was attached when Broker X previously logged off of network 10. The process of re-attaching Broker X to the previously Trader Y is described below with reference to steps 270 through 278.

At step 270, broker proxy server 24 determines the current state of the connection 30g, if any, between broker proxy server 24 and the trading system 26 for communicating with trading system 26 on behalf of Trader Y. If broker proxy server 24 determines that the same connection 30g is still assigned, or being used, for communications on behalf of Trader Y, broker proxy server 24, at step 272, (1) re-attaches Broker X to Trader Y by generating and storing as user relationship data 62 a user relationship between Broker X and Trader Y, and (2) re-establishes and stores as connection data 64 an association between the connection 30g and the user relation between Broker X and Trader Y. Accordingly, at step 274, Broker X may now engage in trading activity in trading system 26 on behalf of Trader Y via the same connection 30g as was used before Broker X logged off at step 260.

Alternatively, if broker proxy server 24 determines at step 270 that a new connection 30g has been assigned, or is being used, for communications on behalf of Trader Y, broker proxy server 24, at step 276, (1) reattaches Broker X to Trader Y by generating and storing as user relationship data 62 a user relationship between Broker X and Trader Y, and (2) establishes and stores as connection data 64 an association between the new connection 30g and the user relation between Broker X and Trader Y. Accordingly, the method proceeds to step 274, at which step Broker X may now engage in trading activity in trading system 26 on behalf of Trader Y via the new connection 30g.

Alternatively, if broker proxy server 24 determines at step 270 that no connection 30g is currently assigned, or being used, for communications on behalf of Trader Y—in other words, that Trader Y is not logged into trading system 26—broker proxy server 24, at step 278, (1) reattaches Broker X to Trader Y by generating and storing as user relationship data 62 a user relationship between Broker X and Trader Y, and (2) establishes (or attempts to establish) an association between a connection 30g and the user relationship between Broker X and Trader Y. The manner in which such a connection is assigned depends on whether Trader Y is an active trader or a passive trader. If Trader Y is a passive trader, the process for establishing the association may include one or more steps similar or identical to steps 180 through 190 discussed above with reference to the method of FIG. 3. Alternatively, if Trader Y is an active trader, the process for establishing the association may include one or more steps similar or identical to steps 204 through 218 discussed above with reference to the method of FIG. 3. Once the association has been established (which, in the case of an active Trader Y may be postponed until Trader Y logs in trading system 26, as discussed above with reference to step 204 of FIG. 3), the method may proceed to step 274, at which step Broker X may now engage in trading activity in trading system 26 on behalf of Trader Y via the new connection 30g.

FIG. 6 illustrates an example table 300 including login data 52, user profile data 54, and user relationship data 56 stored in memory 50 for various users 44 (brokers 40 and traders 34 and 38) of network 10 in accordance with one embodiment of the invention. For each user 44, column 302 indicates the user's user ID; column 304 indicates the user's password; column 306 indicates whether the user is a broker or trader; column 308 indicates whether the user is managed or unmanaged (applies only to traders 34 and 38, not brokers 40); column 310 indicates the authorized user relationships for the user (applies only to brokers 40 and managed traders 38, not unmanaged traders 34); column 312 indicates whether the user is active or passive (applies only to managed traders 38, not brokers 40 or unmanaged traders 34); column 314 indicates the trading systems 26 which the user is permitted to access; and column 316 indicates whether the user is currently logged into network 10. Login data 52 may include the information stored in columns 302, 304, and 316. User profile data 54 may include the information stored in columns 306, 308, 312 and 314. User relationship data 56 may include the information stored in column 310.

FIG. 7 illustrates an example table 330 including user relationship data 62, connection data 64, and user status data 66 stored in memory 60 for various users 44 (brokers 40 and traders 34 and 38) of network 10 in accordance with one embodiment of the invention. For each trader 34 and 38, column 332 indicates the trader's user ID; column 334 indicates whether the trader is managed or unmanaged; column 336 indicates whether the trader is an active or passive trader; column 338 indicates whether the trader is logged into trading network 10; column 340 indicates whether the trader is currently connected to, or logged into, the trading system 26 (whether in response to a request from a trader or in response to a request from a broker 40 attempting to engage in trading activity on behalf of the trader); column 342 identifies the connection, if any, between the broker proxy server 24 and the trading system 26 that has been assigned, or that is being used, for communicating messages associated with the trader between the broker proxy server 24 and the trading system 26; column 344 indicates the brokers 40, if any, that are currently attached to the trader; and column 346 indicates the gateway 22 associated with each broker 40 identified in column 344. User relationship data 62 may include the information stored in column 344, connection data 64 may include the information stored in columns 340, 342 and 244, and user status data 66 may include the information stored in columns 334, 336, 338 and 340.

Particular data stored in table 330 is dynamic over time. For example, the brokers 40 listed in column 344 change over time as brokers 40 attach and detach from various managed traders 38. In addition, the connections listed in column 342 may change over time as connections are assigned, reassigned or otherwise managed by broker proxy server 24.

Figure 8A:
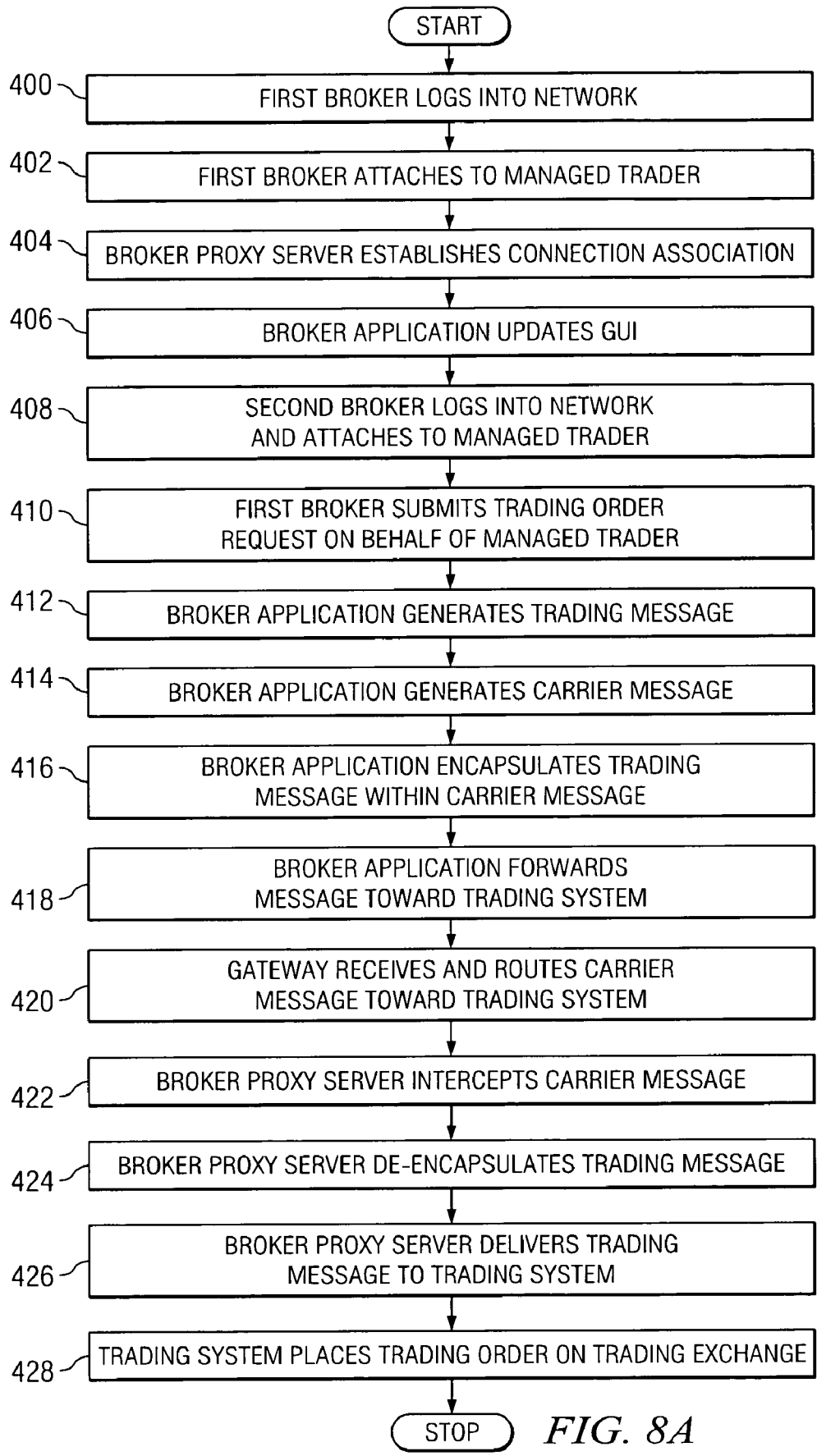
FIGS. 8A-8B illustrate a method of messaging within the system of FIG. 1 in accordance with an embodiment of the present invention.
Figure 8B:
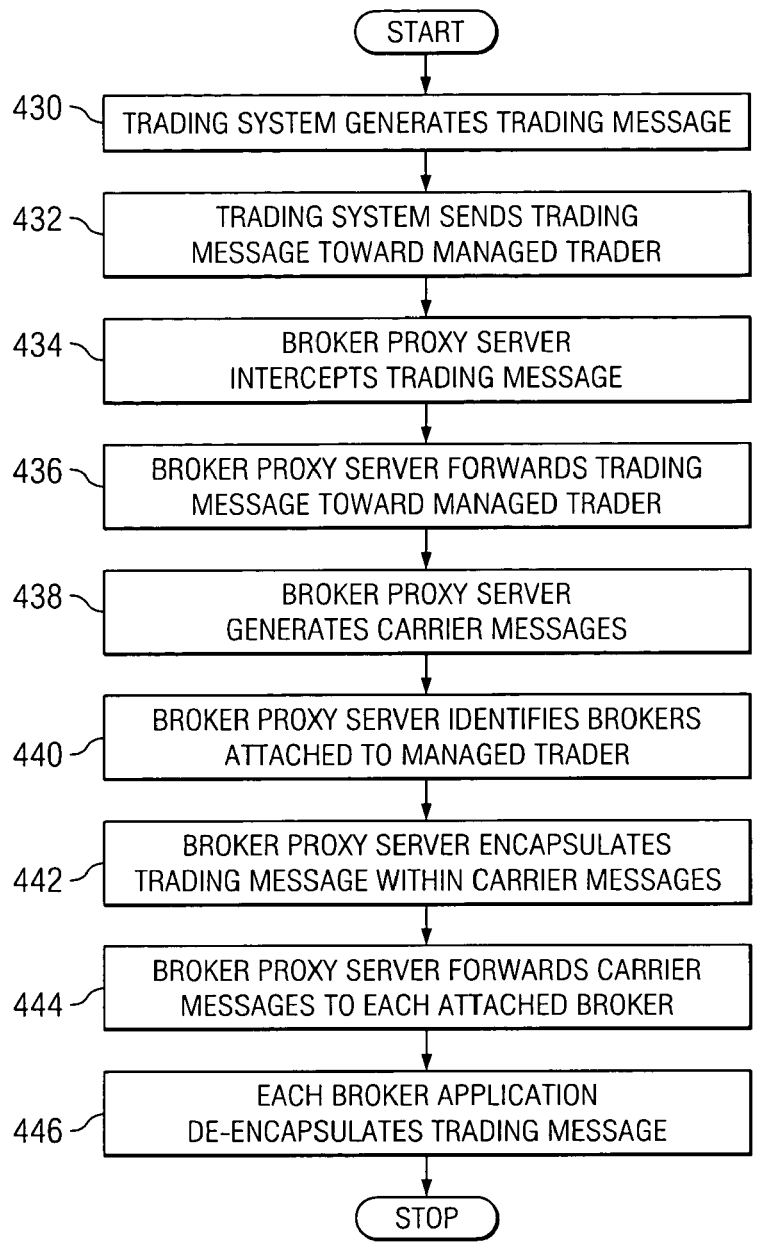

FIGS. 8A-8B illustrate an example method of messaging within system 10 in accordance with an embodiment of the present invention. As shown in FIG. 8A, at step 400, Broker X using broker application 42 logs into network 10 according to the method shown in FIG. 2. As part of the login process, authentication manager 20 identifies a particular trading system 26 in which Broker X is permitted to trade, and sends to session manager 18 associated with broker application 42 an identity of a gateway 22 through which broker application 42 may communicate with the particular trading system 26, as discussed above with reference to steps 118 through 124 of the method of FIG. 2. At step 402, Broker X wishes to engage in trading activity in the particular trading system 26 on behalf of Trader Y, and thus attaches to Trader Y according to the method shown in FIG. 3. In particular, broker proxy server 24 establishes and stores a user relationship between Broker X and Trader Y, as described above with reference to steps 158 and 160 of FIG. 3. In this example situation, Trader Y is an active trader that is currently logged into the particular trading system 26.

At step 404, broker proxy server 24 (1) identifies the connection 30g that is being used to communicate messages regarding trading activity of Trader Y with trading system 26; (2) establishes and stores an association between the user relationship between Broker X and Trader Y (established at step 402) and the identified connection 30g; (3) sends a connection notification to all interested users 44, such as described above with reference to steps 194 through 198 of the method of FIG. 3. At step 406, broker application 42 associated with Broker X updates a GUI presented to Broker X such that Broker X may now engage in trading activity in trading system 26 on behalf of Trader Y via the connection 30g identified at step 404.

At step 408, another broker, Broker Z, logs into network 10 and attaches to Trader Y according to the method shown in FIG. 4. In particular, broker proxy server 24 establishes and stores a user relationship between Broker Z and Trader Y, as described above with reference to step 234 of FIG. 4. In addition, broker proxy server 24 establishes and stores an association between the user relationship between Broker Z and Trader Y (established at step 402) and the connection 30g identified at step 404. Thus, both Broker X and Broker Z may attach to, and may thus engage in trading activity on behalf of, Trader Y.

At some time, Broker X wishes to place a trading order at trading system 26 on behalf of Trader Y. At step 410, Broker X submits, via a GUI provided by broker application 42, a request to place the trading order at trading system 26 on behalf of Trader Y. At step 412, broker application 42 generates a trading message 500 that specifies Trader Y, as well as various other details of the requested trading order, such as the type of order, the financial instrument, the price, and the size of the order, for example. Trading message 500 generated at step 412 represents (or is similar or identical to) the trading message that would have been generated by the trader application 36 associated with Trader Y if Trader Y, rather than Broker X, had initiated the trading order request.

At step 414, broker application 42 generates a carrier message 502 for trading message 500. At step 416, broker application 42 joins or otherwise associates carrier message 502 with trading message 500. In one embodiment, broker application 42 encapsulates trading message 500 within carrier message 502, as shown in FIG. 9.

Figure 9:
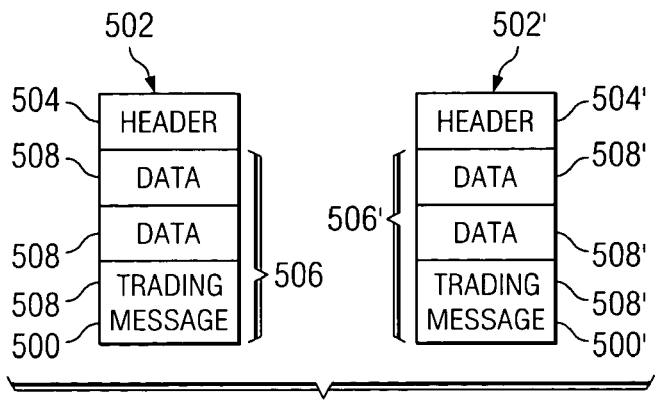
FIG. 9 illustrates an example carrier message used for messaging via the trading network of FIG. 1 in accordance with an embodiment of the invention.

FIG. 9 illustrates an example carrier message 502 in accordance with an embodiment of the invention. Carrier message 502 is a data packet that includes a header 504 that may contain protocol and routing information, and a payload 506 that includes a number of fields 508. A particular field 508 includes the trading message 500 such that the trading message 500 may be said to be encapsulated within carrier message 502. Header 504 may include routing information that identifies the gateway 22 identified at step 400 and the particular trading system 26 for which trading message 500 is intended. One or more fields 508 may include various other data, such as data indicating the message type of trading message 500, for example.

Returning to FIG. 8A, at step 418, broker application 42 communicates carrier message 502 toward the particular trading system 26 based on routing information included in header 504. At step 420, carrier message 502 is received by the gateway 22 and routed toward trading system 26.

At step 422, carrier message 502 is intercepted by broker proxy server 24. At step 424, broker proxy server 24 de-encapsulates trading message 500 from carrier message 502. At step 426, broker proxy server 24 then delivers trading message 500 to the trading system 26 using the connection 30g associated (at step 404) with the user relationship between Broker X and Trader Y based on information within trading message 500, such as information identifying Trader Y. Trading message 500 may include routing information that may be used to route trading message 500 to the proper portion or module of trading system 26 such that trading system 26 may process trading message 500 appropriately. At step 428, the trading system 26 receives and processes trading message 500, and places the requested trading order in a trading exchange maintained by trading system 26. Trading message 500 appears to the trading system 26 as if it was submitted by Trader Y.

As shown in FIG. 8B, at step 430, trading system 26 generates a trading message 500' that indicates that the requested trading order was placed in a trading exchange. At step 432, trading system 26 communicates trading message 500' toward Trader Y via the connection 30g used at step 426 of the method of FIG. 8A. At step 434, the broker proxy server 24 intercepts trading message 500'. At step 436, broker proxy server 24 forwards trading message 500' toward the trading application 36 associated with Trader Y.

At step 438, broker proxy server 24 identifies each broker 40 broker 40 currently attached to Trader Y, including Broker X and Broker Z, based on user relationship data 62 stored in memory 60. At step 440, broker proxy server 24 generates a carrier message 502' for each broker 40 identified at step 438, including Broker X and Broker Z. As shown in FIG. 9, carrier message 502' may be similar to carrier message 502. The header 504' of each carrier message 502' may include routing information that identifies the appropriate gateway 22 and particular broker application 42 for which trading message 500' is intended. One or more fields 508' may include various other data, such as data indicating the message type of trading message 500', for example.

At step 442, broker application 42 joins or otherwise associates a copy or instance of trading message 500' with each carrier message 502'. In one embodiment, broker application 42 encapsulates a copy or instance of trading message 500' within each carrier message 502'. At step 444, the carrier messages 502' are communicated to each respective broker 40, including Broker X and Broker Z, according to routing information included in each respective carrier message 502'. At step 446, the broker application 42 associated with each broker 40 that receives one of the carrier messages 502' (including the broker applications 42 of Broker X and Broker Z) de-encapsulates the trading message 500' from the carrier message 502' and processes the trading message 500' accordingly. Thus, by managing user relationship data 62, which indicates which brokers 40 are currently attached to a managed trader 38, broker proxy server 24 may manage the routing of trading messages 500' to the appropriate users 44.

Although an embodiment of the invention and its advantages are described in detail, a person skilled in the art could make various alterations, additions, and omissions without departing from the spirit and scope of the present invention as defined by the appended claims.

What is claimed is:

1. A method of managing access to a trading network, comprising:
    receiving at a computing device an attachment request, the attachment request including a request to attach a first user to a second user, the attachment request indicates whether the second user is a passive trader or an active trader;
    establishing and storing a user relationship between the first user and the second user;
    when the attachment request indicates that the second user is a passive trader, establishing a first association between the user relationship and a first connection between the computing device and a trading system;
    wherein the established user relationship and the established first association allow the first user to engage in trading activity in the trading system on behalf of the second user via the first connection; and
    when the attachment request indicates that the second user is an active trader:
        (1) determining whether the second user is logged into the trading system; and
        (2) when it is determined that the second user is logged into the trading system, establishing a second association between the user relationship and a second connection between the computing device and the trading system;
    wherein the established user relationship and the established second association allow the first user to engage in trading activity in the trading system on behalf of the second user via the second connection.

2. The method of claim 1, wherein the first connection and the second connection are the same connection such that an association is established between the user relationship and a particular connection between the computing device and the trading system regardless of whether the second user is a passive trader or an active trader.

3. The method of claim 1, further comprising preventing the first user from engaging in trading activity in the trading system on behalf of the second user when it is determined that the second user is not logged into the trading system.

4. The method of claim 1, wherein when it is determined that the second user is not logged into the trading system, the method further comprises:
    waiting to receive a trading system login request from the second user;
    receiving the trading system login request from the second user; and
    in response to receiving the trading system login request from the second user, establishing a third association between the user relationship and a third connection between the computing device and the trading system;
    wherein the established user relationship and the established third association allow the first user to engage in trading activity in the trading system on behalf of the second user via the third connection.

5. The method of claim 4, wherein the third connection and the second connection are the same connection such that an association is established between the user relationship and a particular connection between the computing device and the trading system regardless of whether the second user is logged in at the time the attachment request is received or logs in at a later time.

6. The method of claim 1, wherein the first user is a broker that is prevented from engaging in trading activity via the trading network on behalf of itself.

7. The method of claim 1, further comprising determining whether the second user is authorized to attach to the first user.

8. The method of claim 7, wherein determining whether the second user is authorized to attach to the first user comprises:
    communicating an attachment authorization query to an authentication manager, the attachment authorization query identifying the second user and the first user; and
    receiving from the authentication manager a determination of whether the second user is authorized to engage in trading activity on behalf of the first user.

9. The method of claim 1, further comprising:
    receiving an additional attachment request, the additional attachment request including a request to attach a third user to a second user;
    establishing and storing an additional user relationship between the third user and the second user;
    when the first association is established, establishing an additional association between the additional user relationship and the first connection between the computing device and the trading system;

wherein the established additional user relationship and the established additional association allow the third user to engage in trading activity in the trading system on behalf of the second user via the first connection; and when the second association is established, establishing an additional association between the additional user relationship and the second connection between the computing device and the trading system;

wherein the established additional user relationship and the established additional association allow the third user to engage in trading activity in the trading system on behalf of the second user via the second connection.

10. The method of claim 9, wherein the third user is a broker that is prevented from engaging in trading activity via the trading network on behalf of itself.

11. The method of claim 1, further comprising:
receiving a first network login request for a first user, the first network login request including first authentication information;
approving the first network login request based at least on the received first authentication information, wherein approving the first network login request authorizes the first user to access the trading network; and identifying from a plurality of users one or more associated users, including the second user, for which the first user is authorized to act on behalf of.

12. The method of claim 11, further comprising:
identifying, based at least on the received first authentication information, one or more trading systems to which the first user is authorized access, the one or more trading systems including the particular trading system; and
communicating a list of the identified trading systems.

13. The method of claim 11,
wherein the first user is a first broker;
wherein the method further comprises storing a set of broker-trader relationships, each broker-trader relationship defining a relationship between one of a plurality of brokers and one of a plurality of traders, the plurality of brokers including the first broker and the plurality of traders including the second user; and
wherein the one or more associated users for which the first user is authorized to act on behalf of are identified by identifying from the set of broker-trader relationships each broker-trader relationship between the first broker and any one of the plurality of traders.

14. The method of claim 1, further comprising:
receiving a logoff notification that the first user is logged off of the trading network; in response to receiving the logoff notification, detaching the second user from the first user by removing from storage the user relationship between the first user and the second user.

15. The method of claim 14, further comprising:
after removing the relationship from storage, receiving a logon notification that the first user is logged on to the trading network; and
in response to receiving the logon notification, automatically re-attaching the first user to the second user at least by re-establishing and re-storing the user relationship between the first user and the second user.

16. The method of claim 1, further comprising:
receiving a first network login request for a first user, the first network login request including first authentication information;
approving the first network login request based at least on the received first authentication information, wherein approving the first network login request authorizes the first user to access the trading network;
identifying from a plurality of users one or more associated users, including the second user, for which the first user is authorized to act as a proxy;
obtaining user profile information for the second user, the user profile information including information regarding the second user that can be used to allow the first user to engage in trading activity via the trading network on behalf of the second user; and
communicating the user profile information.

17. A system of managing access to a trading network, the system comprising a computing device operable to:
receive at the computing device an attachment request, the attachment request including a request to attach a first user to a second user, the attachment request indicating whether the second user is a passive trader or an active trader;
establish and storing a user relationship between the first user and the second user;
when the attachment request indicates that the second user is a passive trader, establish a first association between the user relationship and a first connection between the computing device and a trading system;
wherein the established user relationship and the established first association allow the first user to engage in trading activity in the trading system on behalf of the second user via the first connection; and when the attachment request indicates that the second user is an active trader:
(1) determine whether the second user is logged into the trading system; and
(2) when it is determined that the second user is logged into the trading system, establish a second association between the user relationship and a second connection between the computing device and the trading system;
wherein the established user relationship and the established second association allow the first user to engage in trading activity in the trading system on behalf of the second user via the second connection.

18. The system of claim 17, wherein the first connection and the second connection are the same connection such that an association is established between the user relationship and a particular connection between the computing device and the trading system regardless of whether the second user is a passive trader or an active trader.

19. The system of claim 17, wherein when it is determined that the second user is not logged into the trading system, the computing device is further operable to:
wait to receive a trading system login request from the second user;
receive the trading system login request from the second user; and in response to receiving the trading system login request from the second user, establish a third association between the user relationship and a third connection between the computing device and the trading system;
wherein the established user relationship and the established third association allow the first user to engage in trading activity in the trading system on behalf of the second user via the third connection.

20. The system of claim 19, wherein the third connection and the second connection are the same connection such that an association is established between the user relationship and a particular connection between the computing device and the trading system regardless of whether the second user is logged in at the time the attachment request is received or logs in at a later time.

21. The system of claim 17, wherein the first user is a broker that is prevented from engaging in trading activity via the trading network on behalf of itself.

22. The system of claim 17, wherein the computing device is further operable to determine whether the second user is authorized to attach to the first user.

23. The system of claim 22, wherein determining whether the second user is authorized to attach to the first user comprises:
communicating an attachment authorization query to an authentication manager, the attachment authorization query identifying the second user and the first user; and
receiving from the authentication manager a determination of whether the second user is authorized to engage in trading activity on behalf of the first user.

24. The system of claim 17, wherein the computing device is further operable to:
receive an additional attachment request, the additional attachment request including a request to attach a third user to a second user;
establish and storing an additional user relationship between the third user and the second user;
when the first association is established, establish an additional association between the additional user relationship and the first connection between the computing device and the trading system;
wherein the established additional user relationship and the established additional association allow the third user to engage in trading activity in the trading system on behalf of the second user via the first connection; and
when the second association is established, establish an additional association between the additional user relationship and the second connection between the computing device and the trading system;
wherein the established additional user relationship and the established additional association allow the third user to engage in trading activity in the trading system on behalf of the second user via the second connection.

25. The system of claim 24, wherein the third user is a broker that is prevented from engaging in trading activity via the trading network on behalf of itself.

26. The system of claim 17, further comprising an authentication manager operable to:
receive a first network login request for a first user, the first network login request including first authentication information;
approve the first network login request based at least on the received first authentication information, wherein approving the first network login request authorizes the first user to access the trading network; and identify from a plurality of users one or more associated users, including the second user, for which the first user is authorized to act on behalf of.

27. The system of claim 17, wherein the computing device is further operable to:
receive a logoff notification that the first user is logged off of the trading network;
in response to receiving the logoff notification, detach the second user from the first user by removing from storage the user relationship between the first user and the second user.

28. The system of claim 27, wherein the computing device is further operable to:
receive a logon notification that the first user is logged on to the trading network; and
in response to receiving the logon notification, automatically re-attach the first user to the second user at least by re-establishing and re-storing the user relationship between the first user and the second user.

29. The system of claim 17, further comprising an authentication manager operable to:
receive a first network login request for a first user, the first network login request including first authentication information;
approve the first network login request based at least on the received first authentication information, wherein approving the first network login request authorizes the first user to access the trading network;
identify from a plurality of users one or more associated users, including the second user, for which the first user is authorized to act as a proxy;
obtain user profile information for the second user, the user profile information including information regarding the second user that can be used to allow the first user to engage in trading activity via the trading network on behalf of the second user; and
communicate the user profile information.

* * * * *